US009674857B2

(12) United States Patent
Dai et al.

(10) Patent No.: US 9,674,857 B2
(45) Date of Patent: Jun. 6, 2017

(54) METHOD AND DEVICE FOR DATA SCHEDULING

(71) Applicant: ZTE CORPORATION, Shenzhen, Guangdong Province (CN)

(72) Inventors: Qian Dai, Shenzhen (CN); Yingqi Xu, Shenzhen (CN); Jinkui Cheng, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 29 days.

(21) Appl. No.: 14/400,605

(22) PCT Filed: May 7, 2013

(86) PCT No.: PCT/CN2013/075241
§ 371 (c)(1),
(2) Date: Nov. 12, 2014

(87) PCT Pub. No.: WO2013/170712
PCT Pub. Date: Nov. 21, 2013

(65) Prior Publication Data
US 2015/0156793 A1 Jun. 4, 2015

(30) Foreign Application Priority Data

May 14, 2012 (CN) .......................... 2012 1 0148451

(51) Int. Cl.
H04W 72/12 (2009.01)
H04W 72/04 (2009.01)
(Continued)

(52) U.S. Cl.
CPC ... H04W 72/1205 (2013.01); H04W 72/1236 (2013.01); H04W 72/1242 (2013.01);
(Continued)

(58) Field of Classification Search
CPC ............. H04W 72/12; H04W 72/1205; H04W 72/1242; H04W 72/04; H04W 72/08;
(Continued)

(56) References Cited

U.S. PATENT DOCUMENTS

2009/0325512 A1 12/2009 Granlund et al.
2010/0255850 A1* 10/2010 Kaukoranta ...... H04W 74/0866
455/450
2013/0272251 A1* 10/2013 Schmidt ................ H04W 72/12
370/329

FOREIGN PATENT DOCUMENTS

CN 102111819 A 6/2011
CN 102164359 A 8/2011
(Continued)

Primary Examiner — Jae Y Lee
Assistant Examiner — Aixa Guadalupe-Cruz
(74) Attorney, Agent, or Firm — Ling Wu; Stephen Yang; Ling and Yang Intellectual Property

(57) ABSTRACT

A method and apparatus for data scheduling are provided. The method includes: when data arrive at a device, the device judging whether the arrived data have a delay-tolerant characteristic or not; if the arrived data have the delay-tolerant characteristic, then the device delaying scheduling and transmission of the arrived data; and if the arrived data do not have the delay-tolerant characteristic, then the device immediately initiating a call process or immediately initiating a data transmission process. Wherein, the device is a user equipment or a base station. When the device is the user equipment, the arrived data are uplink data, and when the device is the base station, the arrived data are downlink data corresponding to the user equipment. The technical scheme of the present application delays the scheduling of service data with the delay-tolerance characteristic, thus alleviating resource pressure of PUSCH and PDSCH and optimizing system efficiency.

14 Claims, 5 Drawing Sheets

(51) Int. Cl.
  *H04W 72/08*  (2009.01)
  *H04W 72/06*  (2009.01)

(52) U.S. Cl.
  CPC ............ *H04W 72/04* (2013.01); *H04W 72/06* (2013.01); *H04W 72/08* (2013.01); *H04W 72/12* (2013.01)

(58) Field of Classification Search
  CPC ......... H04W 72/1236; H04W 72/1284; H04W 28/06
  See application file for complete search history.

(56) References Cited

FOREIGN PATENT DOCUMENTS

WO     WO2011134553 A1    11/2011
WO     WO 2013044999 A1 *   4/2013  ............ H04W 72/04

\* cited by examiner

METHOD AND DEVICE FOR DATA SCHEDULING

TECHNICAL FIELD

The present document relates to the wireless communication field, and in particular, to a method and apparatus for data scheduling.

BACKGROUND OF THE RELATED ART

In recent years, with the development at full speed of the communication technology, the intellectual mobile phone has become the mainstream of the mobile phone market gradually. The one in conformity with that trend is the various application programs suitable for the intellectual mobile phone spring up like mushrooms after rain, thus enriching people's life greatly, and even changing people's traditional life and entertainment modes.

However, such development has caused new problems. The various applications programs applied to the intellectual mobile phone will produce various services, and the characteristics of those services have nothing in common with each other, and the transmission characteristics of data packets of the services are far from each other as well. Wherein, the representatives are the Instant Message Traffic (IM Traffic) and the Background Traffic (BG Traffic).

In the existing technology, the transmission of the data packet produced by the various services can be divided according to their directions and the state of the user equipment (UE), corresponding to different methods respectively:

1. if the UE is in a Radio Resource Control IDLE (RRC_IDLE) state, and there are the uplink data arrived, then the UE will initiate a random access procedure, to make the UE enter a Radio Resource Control CONNECTED (RRC_CONNECTED) state;

2. if the UE is in the RRC_CONNECTED state, and there are the uplink data arrived, then the UE will transmit a Schedule Request (SR) to the network side to apply for the uplink resources;

3. if the UE is in the RRC_IDLE state, and the downlink data corresponding to the UE arrive at the network side, then the core network will indicate the base station to transmit a Paging message to the UE, and the UE will initiate the random access procedure after receiving this message, and then enter the RRC_CONNECTED state;

4. if the UE is in the RRC_CONNECTED state, and the downlink data corresponding to the UE arrive at the network side, then the base station will add the data into the scheduling sequence, and then transmit to the UE.

On the basis of the above-mentioned transmission method, the UE or the network side will use different logic channels to bear the data according to the priority of the data to be transmitted and transmit the data through different Data Radio Bearer (DRB), and various configurations related to the transmission are configured by the network side through the S1 signaling (the control plane data transmission channel between the core network and the base station), the RRC signaling (the control plane signaling transmission channel between the base station and the UE) or the Media Access Control Layer Control Element (MAC CE).

Meanwhile, in the related art, the Quality of Service (QoS) function already includes some parameters regarding the data packet delay requirement as well.

Because the transmission of the data packet produced by the service suitable for the intellectual mobile phone is often disorderly, moreover, the size of the data packet is often not big, based on the current transmission method for data packets, the application of the similar service will bring the new pressure on the network and the UE, for example, the signaling overhead is increased, the utilization rate of the network resource is low, the power consumption of the UE is increased, etc., and all those are problems to be solved urgently.

SUMMARY

The present document provides a method and apparatus for data scheduling, to reduce the pressure brought by the applications on the network and the UE.

In order to solve the above-mentioned technical problem, the present document discloses a method for data scheduling, comprising:

when data arrive at a device, the device judging whether the arrived data have a delay-tolerant characteristic or not; if the arrived data have the delay-tolerant characteristic, the device delaying scheduling and transmission of the arrived data; and if the arrived data do not have the delay-tolerant characteristic, the device immediately initiating a call process or immediately initiating a data transmission process;

wherein, the device is a user equipment or a base station; when the device is the user equipment, the arrived data are uplink data, and when the device is the base station, the arrived data are downlink data corresponding to the user equipment.

The delay-tolerant characteristic refers to: delaying the data during a scheduling and transfer process of the data.

The device determines that the arrived data have the delay-tolerant characteristic when the arrived data accord with one or more of the following conditions: a delay tolerance of the arrived data exceeds a first preset threshold; a service to which the arrived data belong is a service with the delay-tolerant characteristic; the arrived data are included in a logic channel with the delay-tolerant characteristic; the arrived data are included in a data wireless bearer with the delay-tolerant characteristic; and the user equipment corresponding to the arrived data has the delay-tolerant characteristic.

The delay tolerance of the arrived data is: a delay index included in a quality of service level corresponding to the arrived data.

The delay tolerance of the arrived data exceeding a first preset threshold refers to: the delay index included in the quality of service level corresponding to the arrived data exceeding the first preset threshold.

The first preset threshold is configured through any one of the following ways: the user equipment making an agreement with a network side in advance; the network side configuring for the user equipment through an S1 dedicated signaling, a radio resource control (RRC) dedicated signaling or a media access control layer control element (MAC CE); and the network side setting by itself, and configuring in a core network and/or a base station.

The step that the device delays scheduling and transmission of the arrived data comprises: when the user equipment is in a radio resource control IDLE state, after postponing initiating a random access procedure, the user equipment scheduling and transmitting the arrived data, or after postponing initiating a paging process, the base station scheduling and transmitting the arrived data; and when the user equipment is in a radio resource control connected state, after postponing triggering a schedule request, the user equipment scheduling and transmitting the arrived data, or, after triggering the schedule request, the user equipment delaying transmitting the schedule request and then scheduling and transmitting the arrived data.

The method further comprises, the device scheduling and transmitting the arrived data with the delay-tolerant characteristic when meeting one or more of the following conditions: a total amount of data to be transmitted in an uplink data transmission buffer or a downlink data transmission buffer corresponding to the user equipment reaches or exceeds a second preset threshold; a total amount of data in a buffer of the logic channel including arrived uplink data and arrived downlink data and corresponding to the user equipment reaches or exceeds a third preset threshold; and a delayed time of the arrived data reaches an upper limit of a delay-tolerant time.

The second preset threshold and the third preset threshold are configured in advance through any one of the following ways: the user equipment making an agreement with the network side in advance; the network side configuring for the user equipment through the S1 dedicated signaling, the RRC dedicated signaling or the MAC CE; and the network side setting by itself, and configuring in the core network and/or the base station.

The upper limit of the delay-tolerant time is configured in advance through any one of the following ways: taking the delay index included in the quality of service level corresponding to the arrived data as the upper limit of the delay-tolerant time; taking the delay-tolerant time agreed by the network side and the user equipment in advance and corresponding to the service corresponding to the arrived data as the upper limit of the delay-tolerant time; taking the delay-tolerant time agreed by the network side and the user equipment in advance and corresponding to the logic channel including the arrived data as the upper limit of the delay-tolerant time; taking the delay-tolerant time agreed by the network side and the user equipment in advance and corresponding to the wireless bearer including the arrived data as the upper limit of the delay-tolerant time; taking the delay-tolerant time agreed by the network side and a delay-tolerant user equipment in advance and corresponding to the device with the delay-tolerant characteristic as the upper limit of the delay-tolerant time; and the network side configuring through the S1 dedicated signaling, the RRC dedicated signaling or the MAC CE for the user equipment.

The delayed time of the arrived data reaching the upper limit of the delay-tolerant time refers to: the delayed time of the data being greater than or equal to the upper limit of the delay-tolerant time; or the delayed time of the data added by a preset time offset being greater than or equal to the upper limit of the delay-tolerant time.

The preset time offset is configured in advance through any one of the following ways: the network side making an agreement with the user equipment in advance; and the network side configuring for the user equipment through the S1 dedicated signaling, the RRC dedicated signaling or the MAC CE.

The present document further discloses an apparatus for data scheduling, comprising:
a first module, configured to: when data arrive at a device, judge whether the arrived data have a delay-tolerant characteristic or not; and
a second module, configured to: if the arrived data have the delay-tolerant characteristic, delay scheduling and transmission of the arrived data; and if the arrived data do not have the delay-tolerant characteristic, immediately initiate a call process or immediately initiate a data transmission process;

wherein, the device is a user equipment or a base station; when the device is the user equipment, the arrived data are uplink data, and when the device is the base station, the arrived data are downlink data corresponding to the user equipment.

The delay-tolerant characteristic refers to: delaying the data during a scheduling and transfer process of the data.

The first module is configured to determine that the arrived data have the delay-tolerant characteristic when the arrived data accord with one or more of the following conditions: a delay tolerance of the arrived data exceeds a first preset threshold; a service to which the arrived data belong is a service with the delay-tolerant characteristic; the arrived data are included in a logic channel with the delay-tolerant characteristic; the arrived data are included in a data wireless bearer with the delay-tolerant characteristic; and the user equipment corresponding to the arrived data has the delay-tolerant characteristic.

The delay tolerance of the arrived data is: a delay index included in a quality of service level corresponding to the arrived data.

The delay tolerance of the arrived data exceeding a first preset threshold refers to: the delay index included in the quality of service level corresponding to the arrived data exceeding the first preset threshold.

The first preset threshold is configured through any one of the following ways: the user equipment making an agreement with a network side in advance; the network side configuring for the user equipment through an S1 dedicated signaling, a radio resource control (RRC) dedicated signaling or a media access control layer control element (MAC CE); and the network side setting by itself, and configuring in a core network and/or a base station.

The second module is configured to delay the scheduling and transmission of the arrived data by means of: when the user equipment is in a radio resource control IDLE state, after postponing initiating a random access procedure, making the user equipment schedule and transmit the arrived data, or after postponing initiating a paging process, making the base station schedule and transmit the arrived data; and when the user equipment is in a radio resource control connected state, after postponing triggering a schedule request, making the user equipment schedule and transmit the arrived data, or after triggering the schedule request, making the user equipment delay transmitting the schedule request and then schedule and transmit the arrived data.

The second module is further configured to schedule and transmit the arrived data with the delay-tolerant characteristic when meeting one or more of the following conditions: a total amount of data to be transmitted in an uplink data transmission buffer or a downlink data transmission buffer corresponding to the user equipment reaches or exceeds a second preset threshold; a total amount of the data in a buffer of the logic channel including arrived uplink data and arrived downlink data and corresponding to the user equipment reaches or exceeds a third preset threshold; and a delayed time of the arrived data reaches an upper limit of a delay-tolerant time.

The second preset threshold and the third preset threshold are configured in advance through any one of the following ways: the user equipment making an agreement with the network side in advance; the network side configuring for the user equipment through the S1 dedicated signaling, the RRC dedicated signaling or the MAC CE; and the network side setting by itself, and configuring in the core network and/or the base station.

The upper limit of the delay-tolerant time is configured in advance through any one of the following ways: taking the delay index included in the quality of service level corresponding to the arrived data as the upper limit of the delay-tolerant time; taking the delay-tolerant time agreed by the network side and the user equipment in advance and corresponding to the service corresponding to the arrived data as the upper limit of the delay-tolerant time; taking the delay-tolerant time agreed by the network side and the user equipment in advance and corresponding to the logic channel including the arrived data as the upper limit of the delay-tolerant time; taking the delay-tolerant time agreed by the network side and the user equipment in advance and corresponding to the wireless bearer including the arrived data as the upper limit of the delay-tolerant time; taking the delay-tolerant time agreed by the network side and a delay-tolerant user equipment in advance and corresponding to the device with the delay-tolerant characteristic as the upper limit of the delay-tolerant time; and the network side configuring through the S1 dedicated signaling, the RRC dedicated signaling or the MAC CE for the user equipment.

The delayed time of the arrived data reaching the upper limit of the delay-tolerant time refers to: the delayed time of the data being greater than or equal to the upper limit of the delay-tolerant time; or the delayed time of the data added by a preset time offset being greater than or equal to the upper limit of the delay-tolerant time.

The preset time offset is configured in advance through any one of the following ways: the network side making an agreement with the user equipment in advance; and the network side configuring for the user equipment through the S1 dedicated signaling, the RRC dedicated signaling or the MAC CE.

The technical scheme of the present application delays the scheduling of the service data with the delay-tolerance characteristic, thus alleviating the resource pressure of the PUSCH and the PDSCH and optimizing the system efficiency.

PREFERRED EMBODIMENTS OF THE INVENTION

The embodiment of the present document is described in detail with reference to the accompanying drawings hereinafter. It should be illustrated that, in the case of not conflicting, the embodiments in the present application and features in these embodiments can be combined with each other arbitrarily.

Embodiment 1

The applicant analyzes the transmission characteristics of the data packets of the services suitable for the intellectual mobile phone, and finds that the requirements on the real-time character of the data packets related to the services are not often very high, that is to say, the data packet of the services can tolerate the delay of certain time, that is, if the transmission of the data packet is delayed, it will not influence or obviously influence the user experience. Therefore, in order to solve the new pressure on the network and the UE caused by the application of the similar services, the applicant propose that the reasonable scheduling measures can be adopted for the data packet according to the requirements on the delay of the data packet related to the specific service, thus relieving or solving the pressure caused on the network and the UE by the application of the service.

Specifically, when data arrive at a device, the device judges whether the arrived data have a delay-tolerant characteristic or not; if the arrived data have the delay-tolerant characteristic, then the device delays scheduling and transmission of the arrived data; and if the arrived data do not have the delay-tolerant characteristic, then the device immediately initiates a call process (that is, initiating the call process when the UE is in a RRC idle state) or immediately initiates a data transmission process (that is, initiating the data transmission process when the UE is in a RRC connected state).

Wherein, the device is a user equipment or a base station; when the device is the UE, it refers to that the uplink data arrive at the user equipment, and when the device is the base station, it refers to that the downlink data corresponding to the user equipment arrive at the base station.

While, the delay-tolerant characteristic involved in the present embodiment refers to: delaying the data during a scheduling and transfer process of the data.

The implementation process of the method for data scheduling provided by the present embodiment is described in detail with reference to the accompanying drawings and in combination with embodiments hereinafter.

Figure 1:
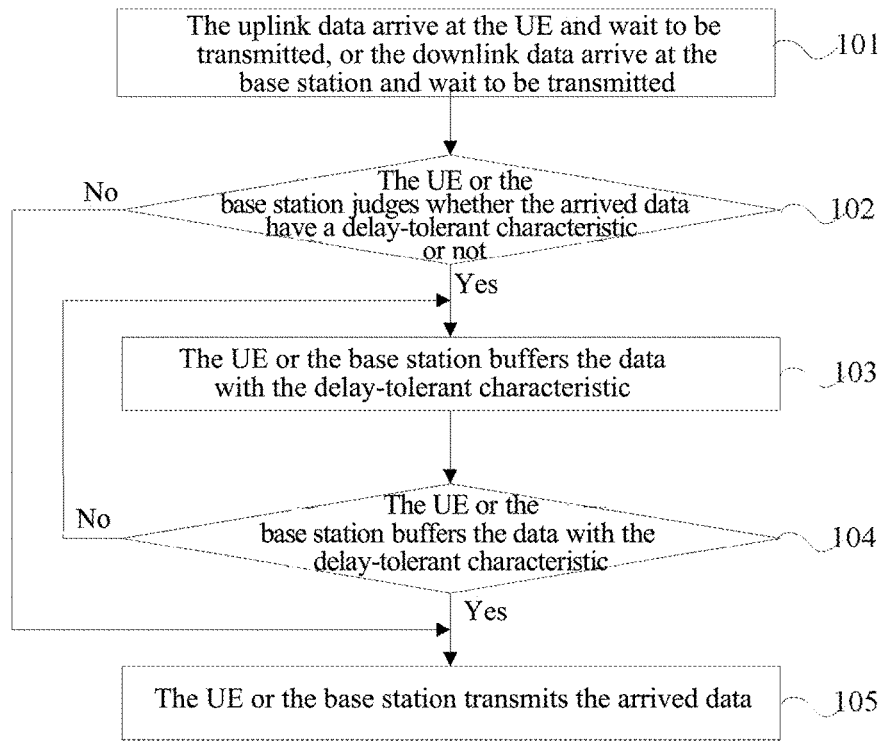
FIG. 1 is a flow chart of a method for data scheduling provided in an embodiment of the present document.

FIG. 1 is the specific process of data scheduling provided by the present embodiment, and the process includes the following steps 101 to 105. The specific steps are as follows.

In step 101: the uplink data arrive at the UE and wait to be transmitted, or the downlink data arrive at the base station and wait to be transmitted.

In step 102, the UE or the base station judges whether the arrived data have a delay-tolerant characteristic or not; if the data have the delay-tolerant characteristic, then step 103 is executed, or else step 105 is executed.

Wherein, the device determines that the arrived data have the delay-tolerant characteristic when the arrived data accord with one or more of the following conditions:

1). a delay tolerance of the arrived data (the arrived uplink data/downlink arrived data) exceeds a first preset threshold;

2). a service to which the arrived data (the uplink/downlink data) belong is the service with the delay-tolerant characteristic;

3). the arrived data (the uplink/downlink data) are included in a logic channel with the delay-tolerant characteristic;

4). the arrived data (the uplink/downlink data) are included in a data wireless bearer with the delay-tolerant characteristic; and 5). the UE corresponding to the arrived data is a device with the delay-tolerant characteristic.

The delay tolerance of the arrived data (the arrived uplink data/downlink arrived data) described in the above-mentioned steps is: a delay index included in a quality of service level corresponding to the arrived data.

While the first preset threshold corresponding to the delay tolerance of the arrived data (the uplink arrived data) can be agreed by the network side and the UE in advance; and also can be configured by the network side for the user equipment through an S1 dedicated signaling, a radio resource control (RRC) dedicated signaling or a media access control layer control element (MAC CE); and also can be set by the network side itself and configured in a core network and/or a base station.

In step 103, the UE or the base station buffers the data with the delay-tolerant characteristic;

if the UE is in a radio resource control IDLE state, the UE postpones initiating a random access procedure, or the base station postpones initiating a paging process; and if the UE is in a radio resource control connected state, the UE postpones triggering a schedule request, or delays transmitting the schedule request after triggering the schedule request.

In step 104, the UE or the base station judges whether to schedule the data with the delay-tolerant characteristic or not; if yes, then step 105 is executed, or else, step 103 is executed.

Wherein, the UE or the base station starts to schedule the arrived data with the delay-tolerant characteristic according to one or a combination of the following conditions:

a total amount of the data to be transmitted in an uplink data transmission buffer or a downlink data transmission buffer corresponding to the UE reaches or exceeds a second preset threshold;

a total amount of the data in a buffer of the logic channel including arrived uplink data and arrived downlink data and corresponding to the UE reaches or exceeds a third preset threshold; and a delayed time of the arrived data with the delay-tolerant characteristic reaches or exceeds an upper limit of a delay-tolerant time.

Wherein, the second preset threshold and the third preset threshold can be configured by adopting any one of the following ways:

the user equipment making an agreement with the network side in advance;

the network side configuring for the UE through the S1 dedicated signaling, the RRC dedicated signaling or the MAC CE; and the network side setting by itself, and configuring in the core network and/or the base station.

The upper limit of the delay-tolerant time can be configured by adopting any one of the following ways:

taking the delay index included in the quality of service level corresponding to the arrived data as the upper limit of the delay-tolerant time;

taking the delay-tolerant time agreed by the network side and the UE in advance and corresponding to the service corresponding to the arrived data as the upper limit of the delay-tolerant time;

taking the delay-tolerant time agreed by the network side and the user equipment in advance and corresponding to a logic channel including the arrived data as the upper limit of the delay-tolerant time;

taking the delay-tolerant time agreed by the network side and the UE in advance and corresponding to a wireless bearer including the arrived data as the upper limit of the delay-tolerant time;

taking the delay-tolerant time agreed by the network side and the delay-tolerant user equipment in advance and corresponding to the device with the delay-tolerant characteristic as the upper limit of the delay-tolerant time; and the network side configuring through the S1 dedicated signaling, the RRC dedicated signaling or the MAC CE for the UE.

While, the delayed time of the arrived data with the delay-tolerant characteristic reaching the upper limit of the delay-tolerant time refers to:

the delayed time of the data being greater than or equal to the upper limit of the delay-tolerant time; or the delayed time of the data added by a preset time offset being greater than or equal to the upper limit of the delay-tolerant time.

Wherein, the preset time offset can be configured through any one of the following modes:

the network side making an agreement with the user equipment in advance; and the network side configuring for the user equipment through the S1 dedicated signaling, the RRC dedicated signaling or the MAC CE.

In step 105, the UE or the base station transmits the arrived data.

Wherein, if the UE is in the RRC idle state, then the UE actively initiates the random access procedure and sets up the RRC connection, and then transmits the arrived uplink data, or the base station transmits the paging message to notify the UE to transmit the random access procedure to set up the RRC connection, and then transmits the arrived downlink data;

if the UE is in the RRC connected state, then the UE transmits the SR to apply for the uplink resources, and then transmits the arrived uplink data, or the base station adds the arrived downlink data into the scheduling sequence, and then transmits the downlink data.

The above-mentioned method is explained in detail in combination with the specific application scenes again hereinafter.

Figure 2:
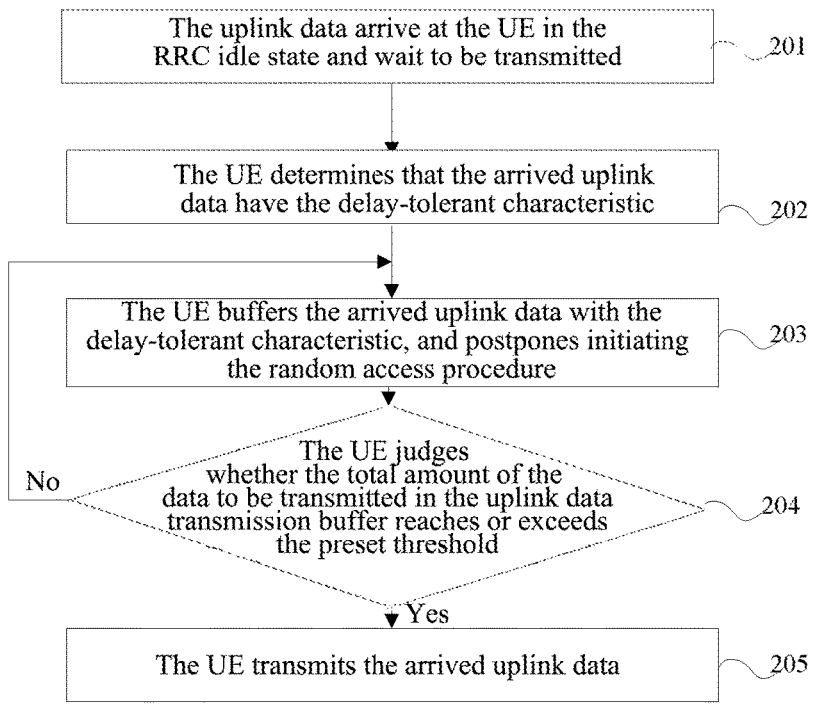
FIG. 2 is a flow chart of a method for uplink data scheduling provided in embodiment 1 of the present document.

Scene one: supposing that when the UE is in the RRC idle state and the uplink data arrive and wait to be transmitted, the specific process of the data scheduling is shown in FIG. 2, including steps 201 to 205. The specific steps are as follows.

In step 201, the uplink data arrive at the UE in the RRC idle state, and wait to be transmitted.

In step 202, the UE determines that the arrived uplink data have the delay-tolerant characteristic.

In the present embodiment, the UE judges whether the data have the delay-tolerant characteristic according to whether the delay tolerance of the arrived uplink data exceeds the preset threshold of the delay tolerance. Wherein, the preset threshold of the delay tolerance of the arrived uplink data can be agreed in advance by the network side and the UE, and can also be configured for the UE through the S1 dedicated signaling, the RRC dedicated signaling or the MAC CE by the network side.

In the present embodiment, the delay index included in the QoS parameter corresponding to the arrived uplink data of the UE exceeds the preset threshold of the delay tolerance, therefore, in the present embodiment, the arrived uplink data have the delay-tolerant characteristic.

In step 203, the UE buffers the arrived uplink data with the delay-tolerant characteristic, and postpones initiating the random access procedure.

In the present embodiment, the UE buffers the arrived uplink data with the delay-tolerant characteristic into the uplink data transmission buffer.

In step 204, the UE judges whether the total amount of the data to be transmitted in the uplink data transmission buffer reaches or exceeds the preset threshold; if it reaches or exceeds the preset threshold, then step 205 is executed, otherwise, step 203 is executed.

Wherein, the preset threshold is a preset threshold of the amount of the buffered data, and the threshold is agreed in advance by the UE and the network side.

The total amount of the arrived uplink data exceeds the preset threshold of the amount of the buffered data, therefore, the UE should then transmit the arrived uplink data.

In step 205, the UE transmits the arrived uplink data.

In this scene, the UE is in the RRC idle state, so the UE actively initiates the random access procedure and sets up the RRC connection at first, and then sets up a corresponding Data Radio Bearer (DRB), and then transmits the arrived uplink data.

Figure 3:
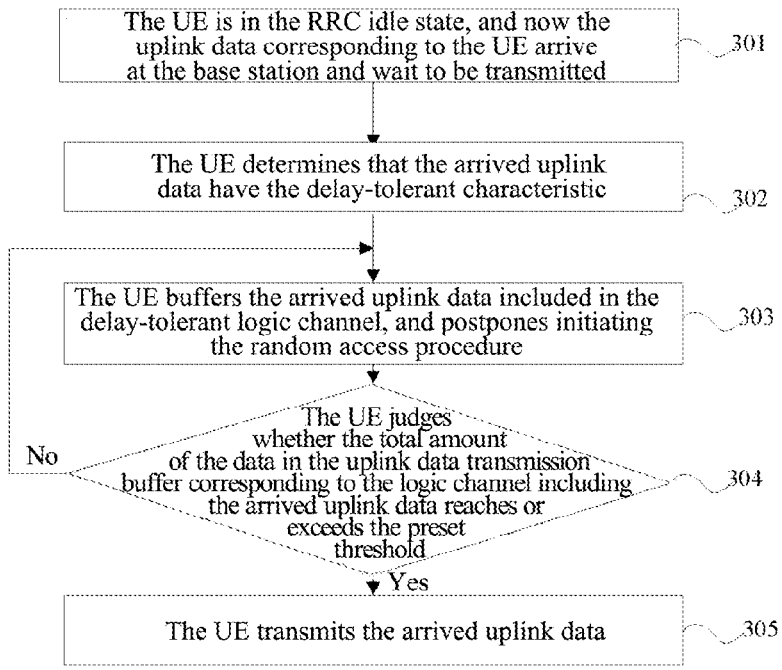
FIG. 3 is a flow chart of a method for downlink data scheduling provided in embodiment 2 of the present document.

Scene two: supposing that when the uplink data arrive at the UE in the RRC idle state and wait to be transmitted, the process of data scheduling is shown in FIG. 3, including steps 301 to 305. The specific steps are as follows.

In step 301, the UE is in the RRC idle state, and now the uplink data corresponding to the UE arrive and wait to be transmitted.

In step 302, the UE determines that the arrived uplink data have the delay-tolerant characteristic.

In the present embodiment, the UE judges whether the arrived uplink data have the delay-tolerant characteristic according to whether the logic channel including the arrived uplink data is the delay-tolerant logic channel.

In the present embodiment, the logic channel including the arrived uplink data is the delay-tolerant logic channel, so the arrived uplink data have the delay-tolerant characteristic.

In step 303, the UE buffers the arrived uplink data included in the delay-tolerant logic channel, and postpones initiating the random access procedure.

In the present embodiment, the UE buffers the arrived uplink data with the delay-tolerant characteristic into the uplink data transmission buffer corresponding to the logic channel.

In step 304, the UE judges whether the total amount of the data in the uplink data transmission buffer corresponding to the logic channel including the arrived uplink data reaches or exceeds the preset threshold; if it reaches or exceeds the preset threshold, then step 305 is executed, otherwise, step 303 is executed.

In the present embodiment, the preset threshold is the preset threshold of the amount of the buffered data, and the threshold is agreed in advance by the UE and the network side.

In the present embodiment, the total amount of the arrived uplink data exceeds the preset threshold of the amount of the buffered data, therefore, the UE should then transmit the arrived uplink data.

In step 305, the UE transmits the arrived uplink data.

In this scene, the UE is in the RRC idle state, so the UE actively initiates the random access procedure and sets up the RRC connection at first, and then sets up the corresponding Data Radio Bearer (DRB), and then transmits the arrived uplink data.

Figure 4:
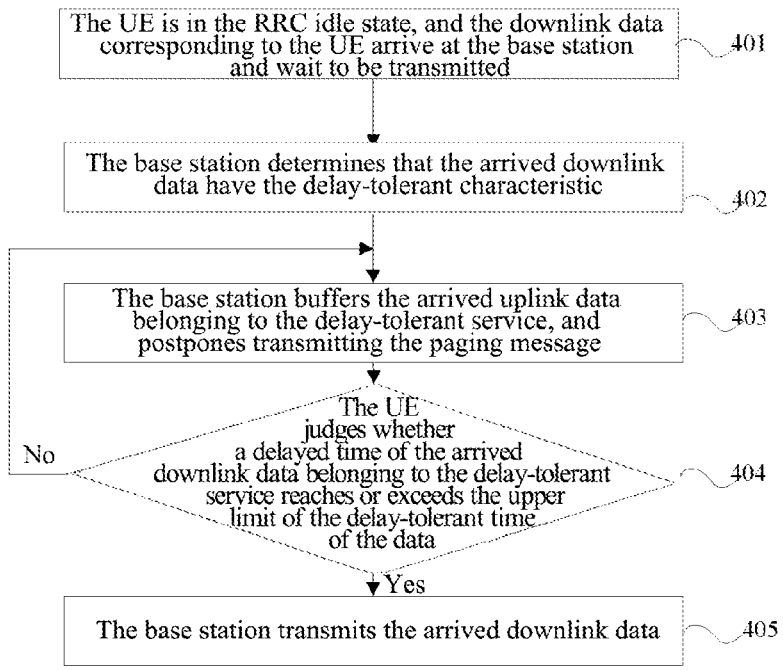
FIG. 4 is a flow chart of a method for uplink data scheduling provided in embodiment 3 of the present document.

Scene three: supposing that when the UE is in the RRC idle state and the downlink data corresponding to the UE arrive at the base station and wait to be transmitted, now the process of data scheduling is shown in FIG. 4, including steps 401 to 405. The specific steps are as follows.

In step 401, the UE is in the RRC idle state, and the downlink data corresponding to the UE arrive at the base station and wait to be transmitted.

In step 402, the base station determines that the arrived downlink data have the delay-tolerant characteristic.

In the present embodiment, the base station judges whether the data have the delay-tolerant characteristic according to whether the arrived downlink data belong to the delay-tolerant service.

In the present embodiment, the service to which the arrived downlink data of the base station belong is the delay-tolerant service, so in the present embodiment, the arrived downlink data have the delay-tolerant characteristic.

In step 403, the base station buffers the arrived uplink data belonging to the delay-tolerant service, and postpones transmitting the paging message.

In step 404, the UE judges whether a delayed time of the arrived downlink data belonging to the delay-tolerant service reaches or exceeds the upper limit of the delay-tolerant time of the data; if it reaches or exceeds the upper limit of the delay-tolerant time, then step 405 is executed, otherwise, step 403 is executed.

In the present embodiment, the upper limit of the delay-tolerant time is the delay index included in the QoS parameter corresponding to the arrived downlink data, alternatively, it is a specific value, agreed in advance by the UE and the network side, of the delay-tolerate time corresponding to the service to which the arrived downlink data belong, or is set by the network side itself according to the performance requirement of the network, and configured in the core network and/or the base station.

In the present embodiment, the delay time of the arrived downlink data already reaches the upper limit of the delay-tolerant time, therefore, the base station will then transmit the arrived downlink data.

In step 405, the base station transmits the arrived downlink data.

In this scene, the UE is in the RRC idle state, so the base station transmits the paging message to notify the UE that the downlink data arrive, and then the UE initiates the random access procedure and sets up the RRC connection, and then sets up the corresponding Data Radio Bearer (DRB), and then receives the downlink data transmitted by the base station.

Figure 5:
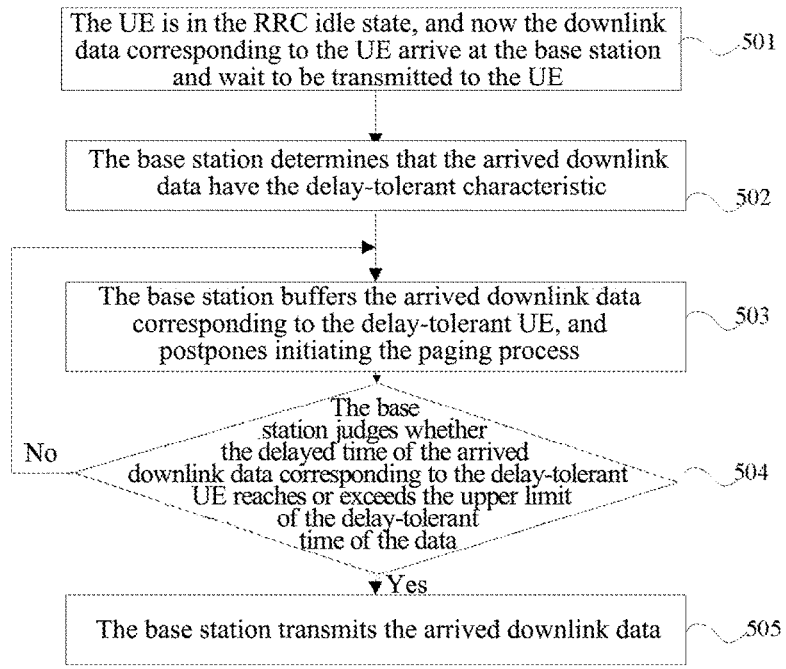
FIG. 5 is a flow chart of a method for downlink data scheduling provided in embodiment 4 of the present document.

Scene four: supposing that the UE is in the RRC idle state and the downlink data corresponding to the UE arrive at the base station and wait to be transmitted, now the process of data scheduling is shown in FIG. 5, including steps 501 to 505. The specific steps are as follows.

In step 501, the UE is in the RRC idle state, and now the downlink data corresponding to the UE arrive at the base station and wait to be transmitted to the UE.

In step 502, the base station determines that the arrived downlink data have the delay-tolerant characteristic.

In the present embodiment, the base station judges whether the arrived downlink data have the delay-tolerant characteristic according to whether the UE corresponding to the arrived downlink data is the delay-tolerant user equipment.

In the present embodiment, the base station knows that the UE is the delay-tolerant user equipment according to the information about the UE stored by the device, such as, the core network, etc., therefore, the arrived downlink data have the delay-tolerant characteristic.

In step 503, the base station buffers the arrived downlink data corresponding to the delay-tolerant UE, and postpones initiating the paging process.

In step 504, the base station judges whether the delayed time of the arrived downlink data corresponding to the delay-tolerant UE reaches or exceeds the upper limit of the delay-tolerant time of the data; if it reaches or exceeds the upper limit of the delay-tolerant time, then step 505 is executed, otherwise, step 503 is executed.

In the present embodiment, the upper limit of the delay-tolerant time is a sum of a specific value, agreed in advance by the network side and the delay-tolerant UE, of the upper limit of the delay-tolerant time corresponding to the delay-tolerant device and a time offset, wherein, the time offset is also a specific value agreed in advance by the network side and the UE.

In the present embodiment, the delay time of the arrived downlink data already reaches the upper limit of the delay-tolerant time, therefore, the base station will then transmit the arrived uplink data.

In step 505, the base station transmits the arrived downlink data.

In this scene, the UE is in the RRC idle state, so the base station transmits the paging message to notify the UE that the downlink data arrive, and then the UE initiates the random access procedure and sets up the RRC connection, and then sets up the corresponding Data Radio Bearer (DRB), and then receives the downlink data transmitted by the base station.

Figure 6:
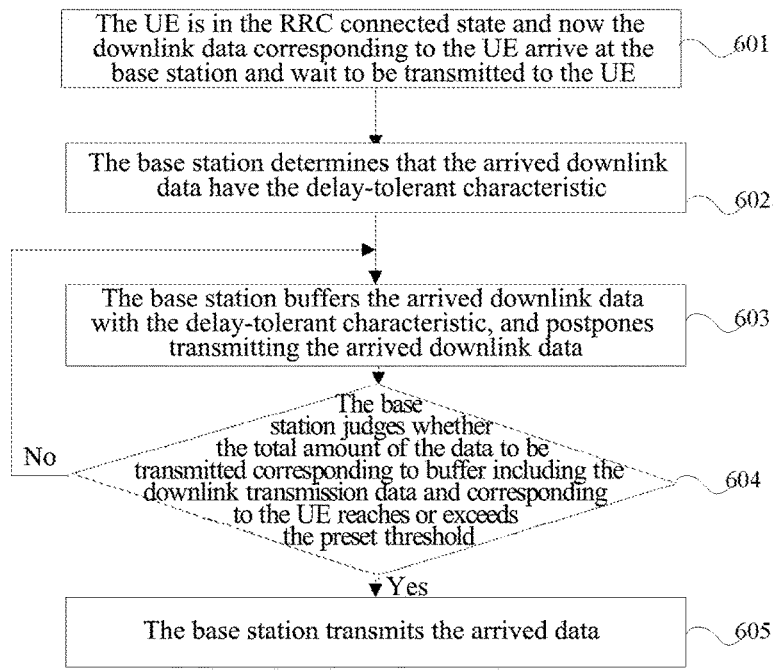
FIG. 6 is a flow chart of a method for downlink data scheduling provided in embodiment 5 of the present document.

Scene five: supposing that the UE is in the RRC connected state and the downlink data corresponding to the UE arrive at the base station and wait to be transmitted, now the process of data scheduling is shown in FIG. 6, including steps 601 to 605. The specific steps are as follows.

In step 601, the UE is in the RRC connected state and now the downlink data corresponding to the UE arrive at the base station and wait to be transmitted to the UE.

In step 602, the base station determines that the arrived downlink data have the delay-tolerant characteristic.

In the present embodiment, the base station judges whether the data have the delay-tolerant characteristic according to whether the delay tolerance of the arrived downlink data exceeds the preset threshold of the delay tolerance. Wherein, the preset threshold of the delay tolerance of the arrived downlink data is set by the network side itself according to the requirement, such as, the network performance, etc.

In the present embodiment, the delay index included in the QoS parameter corresponding to the arrived downlink data exceeds the preset threshold of the delay tolerance, therefore, in the present embodiment, the arrived downlink data have the delay-tolerant characteristic.

In step 603, the base station buffers the arrived downlink data with the delay-tolerant characteristic, and postpones transmitting the arrived downlink data.

In the present embodiment, the base station buffers the arrived downlink data with the delay-tolerant characteristic into the downlink data transmission buffer.

In step 604, the base station judges whether the total amount of the data to be transmitted corresponding to the buffer including the downlink transmission data and corresponding to the UE reaches or exceeds the preset threshold; if it reaches or exceeds the preset threshold, then step 605 is executed, otherwise, step 603 is executed.

In the present embodiment, the preset threshold is the preset threshold of the amount of the buffered data, and the threshold is set by the network side itself according to the performance requirement of the network, and configured in the core network and/or the base station.

In the present embodiment, the total amount of the arrived downlink data exceeds the preset threshold of the amount of the buffered data, therefore, the base station should then transmit the arrived downlink data.

In step 605, the base station transmits the arrived data.

In the present embodiment, the UE is in the RRC connection, so the base station adds the arrived downlink data into the scheduling sequence, and then transmits the downlink data.

Figure 7:
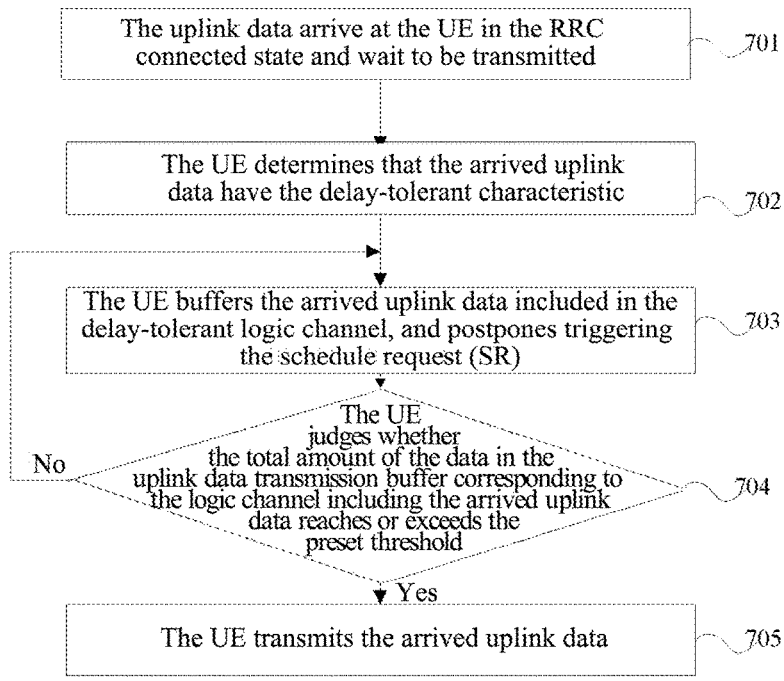
FIG. 7 is a flow chart of a method for uplink data scheduling provided in embodiment 6 of the present document.

Scene six: supposing that the UE is in the RRC connected state and the uplink data arrive at the UE and wait to be transmitted, now the process of data scheduling is shown in FIG. 7, including steps 701 to 705. The specific steps are as follows.

In step 701, the uplink data arrive at the UE in the RRC connected state and wait to be transmitted.

In step 702, the UE determines that the arrived uplink data have the delay-tolerant characteristic.

In the present embodiment, the UE judges whether the arrived uplink data have the delay-tolerant characteristic according to whether the logic channel including the arrived uplink data is the delay-tolerant logic channel.

In the present embodiment, the logic channel including the arrived uplink data is the delay-tolerant logic channel, so the arrived uplink data have the delay-tolerant characteristic.

In step 703, the UE buffers the arrived uplink data included in the delay-tolerant logic channel, and postpones triggering the schedule request (SR).

In the present embodiment, the UE buffers the arrived uplink data with the delay-tolerant characteristic into the uplink data transmission buffer corresponding to the logic channel.

In step 704, the UE judges whether the total amount of the data in the uplink data transmission buffer corresponding to the logic channel including the arrived uplink data reaches or exceeds the preset threshold; if it reaches or exceeds the preset threshold, then step 705 is executed, otherwise, step 703 is executed.

In the present embodiment, the preset threshold is the preset threshold of the amount of the buffered data, and the threshold is configured for the UE by the network side through the S1 dedicated signaling, the RRC dedicated signaling and the MAC CE.

In the present embodiment, the total amount of the arrived uplink data exceeds the preset threshold of the amount of the buffered data, therefore, the UE should then transmit the arrived uplink data.

In step 705, the UE transmits the arrived uplink data.

In the present embodiment, the UE is in the RRC connected state, so the UE transmits the schedule request (SR) at first to apply for the uplink resources, and the uplink grant (UL Grant) is assigned for it at the network side (base station), and the UE transmits the arrived uplink data by using the uplink resources indicated by the UL Grant.

Figure 8:
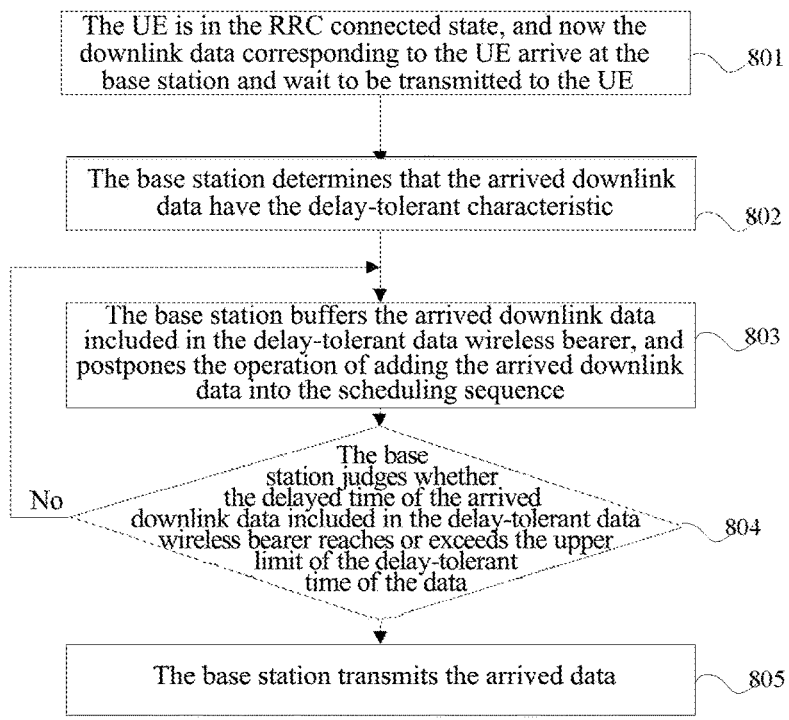
FIG. 8 is a flow chart of a method for downlink data scheduling provided in embodiment 7 of the present document.

Scene seven: supposing that the UE is in the RRC connected state and the downlink data corresponding to the UE arrive at the base station and wait to be transmitted to the UE, now the process of data scheduling is shown in FIG. 8, including steps 801 to 805. The specific steps are as follows.

In step 801: the UE is in the RRC connected state, and now the downlink data corresponding to the UE arrive at the base station and wait to be transmitted to the UE.

In step 802, the base station determines that the arrived downlink data have the delay-tolerant characteristic.

In the present embodiment, the base station judges whether the arrived downlink data have the delay-tolerant characteristic according to the characteristic of the data wireless bearer for bearing the arrived downlink data, that is, whether the data wireless bearer is delay-tolerant.

In the present embodiment, the data wireless bearer for bearing the arrived downlink data is delay-tolerant, therefore, the arrived downlink data have the delay-tolerant characteristic.

In step 803, the base station buffers the arrived downlink data included in the delay-tolerant data wireless bearer, and postpones the operation of adding the arrived downlink data into the scheduling sequence.

In step 804, the base station judges whether the delayed time of the arrived downlink data included in the delay-tolerant data wireless bearer reaches or exceeds the upper limit of the delay-tolerant time of the data; if it reaches or exceeds the upper limit of the delay-tolerant time of the data, then step 805 is executed, otherwise, step 803 is executed.

In the present embodiment, the upper limit of the delay-tolerant time is a specific value, agreed in advance by the UE and the network side, of the delay-tolerant time corresponding to the data wireless bearer for bearing the arrived downlink data.

In the present embodiment, the delay time of the arrived downlink data already reaches the upper limit of the delay-tolerant time, therefore, the base station will then transmit the arrived uplink data.

In step 805, the base station transmits the arrived data.

In the present embodiment, the UE is in the RRC connected state, so the base station adds the arrived downlink data into the scheduling sequence and then transmits the downlink data.

Figure 9:
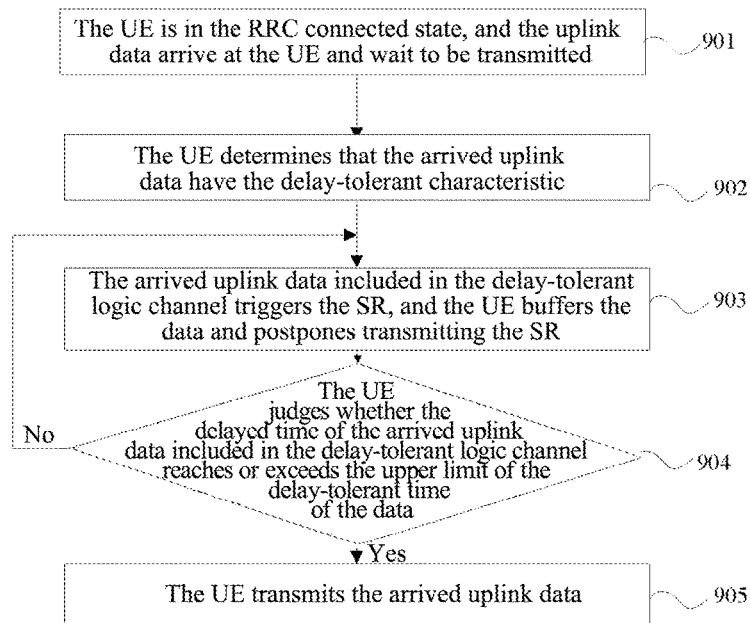
FIG. 9 is a flow chart of a method for uplink data scheduling provided in embodiment 8 of the present document.

Scene eight: supposing that the UE is in the RRC connected state and the uplink data arrive at the UE and wait to be transmitted, now the process of data scheduling is shown in FIG. 9, including steps 901 to 905. The specific steps are as follows.

In step 901, the UE is in the RRC connected state, and the uplink data arrive at the UE and wait to be transmitted.

In step 902, the UE determines that the arrived uplink data have the delay-tolerant characteristic.

In the present embodiment, the UE judges whether the arrived uplink data have the delay-tolerant characteristic according to whether the logic channel including the arrived uplink data is the delay-tolerant logic channel.

In the present embodiment, the logic channel including the arrived uplink data is the delay-tolerant logic channel, so the arrived uplink data have the delay-tolerant characteristic.

In step 903, the arrived uplink data included in the delay-tolerant logic channel triggers the SR, and the UE buffers the data and postpones transmitting the SR.

In step 904, the UE judges whether the delayed time of the arrived uplink data included in the delay-tolerant logic channel reaches or exceeds the upper limit of the delay-tolerant time of the data; if it reaches or exceeds the upper limit of the delay-tolerant time, then step 905 is executed, otherwise, step 903 is executed, that is, buffering the data and postponing transmitting the SR.

In the present embodiment, the upper limit of the delay-tolerant time is a sum of a specific value, configured by the network side for the UE through the S1 dedicated signaling, the RRC dedicated signaling or the MAC CE, or agreed in advance by the network side and the UE, of the upper limit of the delay-tolerant time corresponding to the delay-tolerant logic channel and a time offset, wherein, the time offset is also configured by the network side for the UE through the S1 dedicated signaling, the RRC dedicated signaling or the MAC CE.

In the present embodiment, the delay time of the arrived uplink data already reaches the upper limit of the delay-tolerant time, therefore, the UE will then transmit the arrived uplink data.

In step 905, the UE transmits the arrived uplink data.

In the present embodiment, the UE is in the RRC connected state, so the UE transmits the schedule request (SR) at first to apply for the uplink resources and the uplink grant (UL Grant) is assigned for it at the network side (base station), and the UE transmits the arrived uplink data by using the uplink resources indicated by the UL Grant.

Figure 10:
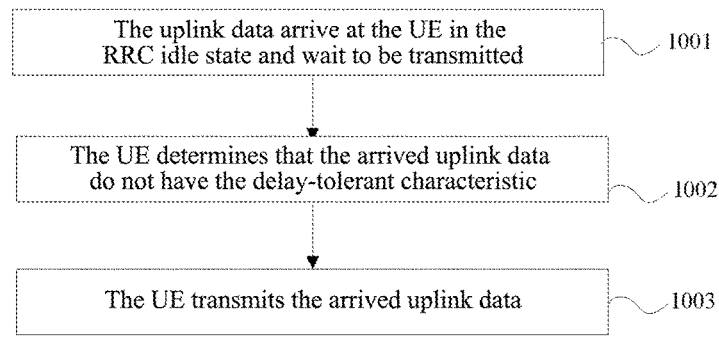
FIG. 10 is a flow chart of a method for uplink data scheduling provided in embodiment 9 of the present document.

Scene nine: supposing that the UE is in the RRC idle state and the uplink data arrive at the UE and wait to be transmitted, now the process of data scheduling is shown in FIG. 10, including steps 1001 to 1003. The specific steps are as follows.

In step 1001, the uplink data arrive at the UE in the RRC idle state and wait to be transmitted.

In step 1002, the UE determines that the arrived uplink data do not have the delay-tolerant characteristic.

In the present embodiment, the UE judges whether the data have the delay-tolerant characteristic according to whether the delay tolerance of the arrived uplink data exceeds the preset threshold of the delay tolerance. Wherein, the preset threshold of the delay tolerance of the arrived uplink data can be agreed in advance by the network side and the UE, and can also be configured for the UE through the S1 dedicated signaling, the RRC dedicated signaling or the MAC CE by the network side.

In the present embodiment, the delay index included in the QoS parameter corresponding to the arrived uplink data of the UE does not exceed the preset threshold of the delay tolerance, therefore, in the present embodiment, the arrived uplink data do not have the delay-tolerant characteristic.

In step 1003, the UE transmits the arrived uplink data.

In the present embodiment, the UE is in the RRC idle state, so the UE actively initiates the random access procedure and sets up the RRC connection at first, and then sets up the corresponding Data Radio Bearer (DRB), and then transmits the arrived uplink data.

Figure 11:
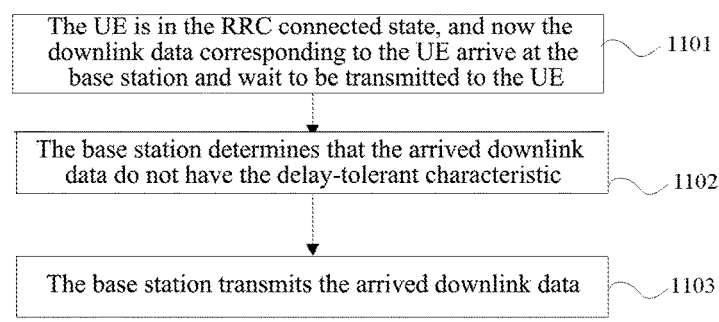
FIG. 11 is a flow chart of a method for downlink data scheduling provided in embodiment 10 of the present document.

Scene ten: supposing that the UE is in the RRC connected state and the downlink data corresponding to the UE arrive at the base station and wait to be transmitted, now the process of data scheduling is shown in FIG. 11, including steps 1101 to 1103. The specific steps are as follows.

In step 1101, the UE is in the RRC connected state, and now the downlink data corresponding to the UE arrive at the base station and wait to be transmitted to the UE.

In step 1102, the base station determines that the arrived downlink data do not have the delay-tolerant characteristic.

In the present embodiment, the base station judges whether the arrived downlink data have the delay-tolerant characteristic according to whether the logic channel including the arrived downlink data is the delay-tolerant logic channel.

In the present embodiment, the logic channel including the arrived downlink data is not the delay-tolerant logic channel, so the arrived downlink data do not have the delay-tolerant characteristic.

In step 1103, the base station transmits the arrived downlink data.

In present embodiment, the UE is in the RRC connected state, so the base station adds the arrived downlink data into the scheduling sequence, and then transmits the downlink data.

Embodiment 2

The present embodiment provides an apparatus for data scheduling, and the apparatus can be a base station or a user equipment. Specifically, the apparatus at least includes a first module and a second module.

The first module is configured to: when data arrive at the present device, judge whether the arrived data have a delay-tolerant characteristic or not; wherein, the delay-tolerant characteristic refers to: delaying the data during a scheduling and transfer process of the data.

The second module is configured to: if the arrived data have the delay-tolerant characteristic, delay scheduling and transmission of the arrived data; and if the arrived data do not have the delay-tolerant characteristic, immediately initiate a call process or immediately initiate a data transmission process.

It should be illustrated that when the device is a user equipment, the data arriving at the present device means that the uplink data arrive at the user equipment. And when the device is a base station, the data arriving at the present device means that the downlink data corresponding to the user equipment arrive at the base station.

Specifically, the first module can just determine that the arrived data have the delay-tolerant characteristic when the arrived data accord with one or more of the following conditions:

a delay tolerance of the arrived data exceeds a first preset threshold (the delay tolerance of the arrived data in the present embodiment is: a delay index included in the quality of service (QOS) level corresponding to the arrived data);

a service to which the arrived data belong is the service with the delay-tolerant characteristic;

the arrived data are included in a logic channel with the delay-tolerant characteristic;

the arrived data are included in a data wireless bearer with the delay-tolerant characteristic; and the user equipment corresponding to the arrived data has the delay-tolerant characteristic.

The above-mentioned first preset threshold can be configured through any one of the following ways:

the user equipment making an agreement with a network side in advance;

the network side configuring for the user equipment through an S1 dedicated signaling, a radio resource control (RRC) dedicated signaling or a media access control layer control element (MAC CE); and the network side setting by itself, and configuring in a core network and/or a base station.

While, the second module delaying the scheduling and transmission of the arrived data refers to: when the user equipment is in a radio resource control IDLE state, after the user equipment postpones initiating a random access procedure, the user equipment scheduling and transmitting the arrived data, or after the base station postpones initiating a paging process, the base station scheduling and transmitting the arrived data; and when the user equipment is in a radio resource control connected state, after the user equipment postpones triggering a schedule request, the user equipment scheduling and transmitting the arrived data, or after the user equipment triggers the schedule request, the user equipment delaying transmitting the schedule request and then scheduling and transmitting the arrived data.

Specifically, the second module schedules and transmits the arrived data when meeting one or more of the following conditions:

a total amount of the data to be transmitted in an uplink data transmission buffer or a downlink data transmission buffer corresponding to the user equipment reaches or exceeds a second preset threshold;

a total amount of the data in a buffer of the logic channel including arrived uplink data and arrived downlink data and corresponding to the user equipment reaches or exceeds a third preset threshold; and a delayed time of the arrived data reaches an upper limit of a delay-tolerant time.

It should be illustrated that the delayed time of the arrived data reaching the upper limit of the delay-tolerant time refers to: the delayed time of the data being greater than or equal to the upper limit of the delay-tolerant time; or the delayed time of the data added by a preset time offset being greater than or equal to the upper limit of the delay-tolerant time. Wherein, the preset time offset can be agreed in advance by the network side and the user equipment; or configured by the network side for the user equipment through the S1 dedicated signaling, the RRC dedicated signaling or the MAC CE.

Wherein, both the above-mentioned second preset threshold and third preset threshold can be set in advance through any one of the following ways:

the user equipment making an agreement with the network side in advance;

the network side configuring for the user equipment through the S1 dedicated signaling, the RRC dedicated signaling or the MAC CE; and the network side setting by itself, and configuring in the core network and/or the base station.

The upper limit of the delay-tolerant time can be set in advance through any one of the following ways:

taking the delay index included in the quality of service level corresponding to the arrived data as the upper limit of the delay-tolerant time;

taking the delay-tolerant time agreed by the network side and the user equipment in advance and corresponding to the service corresponding to the arrived data as the upper limit of the delay-tolerant time;

taking the delay-tolerant time agreed by the network side and the user equipment in advance and corresponding to a logic channel including the arrived data as the upper limit of the delay-tolerant time;

taking the delay-tolerant time agreed by the network side and the user equipment in advance and corresponding to a wireless bearer including the arrived data as the upper limit of the delay-tolerant time;

taking the delay-tolerant time agreed by the network side and the delay-tolerant user equipment in advance and corresponding to the device with the delay-tolerant characteristic as the upper limit of the delay-tolerant time; and the network side configuring through the S1 dedicated signaling, the RRC dedicated signaling or the MAC CE for the user equipment.

It can be understood by those skilled in the art that all or part of steps in the above-mentioned method can be fulfilled by programs instructing the relevant hardware components, and the programs can be stored in a computer readable storage medium such as a read only memory, a magnetic disk or an optical disk, etc. Alternatively, all or part of the steps in the above-mentioned embodiments can be implemented with one or more integrated circuits. Accordingly, each module/unit in the above-mentioned embodiments can be implemented in a form of hardware, or in a form of software function module. The present document is not limit to any specific form of the combination of the hardware and software.

The above description is only for the embodiments of the present document and is not intended to limit the protection scope of the present document. All of modifications, equivalents and/or variations without departing from the spirit and essence of the present document should be embodied in the scope of the appended claims of the present document.

INDUSTRIAL APPLICABILITY

Compared with the related art, the technical scheme of the present application delays the scheduling of the service data with the delay-tolerance characteristic, thus alleviating the resource pressure of the PUSCH and the PDSCH and optimizing the system efficiency.

What we claim is:

1. A method for data scheduling, comprising:
when data arrive at a device, the device judging whether the arrived data have a delay-tolerant characteristic or not; if the arrived data have the delay-tolerant characteristic, then the device delaying scheduling and transmission of the arrived data; and if the arrived data do not have the delay-tolerant characteristic, then the device immediately initiating a call process or immediately initiating a data transmission process;
wherein, the device is a user equipment or a base station; when the device is the user equipment, the arrived data are uplink data, and when the device is the base station, the arrived data are downlink data corresponding to the user equipment;
wherein, the step of the device delaying scheduling and transmission of the arrived data comprises:
when the user equipment is in a radio resource control IDLE state, the user equipment postponing initiating a random access procedure and then scheduling and transmitting the arrived data, or the base station postponing initiating a paging process and then scheduling and transmitting the arrived data; and
when the user equipment is in a radio resource control connected state, the user equipment postponing triggering a schedule request and then scheduling and transmitting the arrived data, or the user equipment triggering the schedule request and delaying transmitting the schedule request and then scheduling and transmitting the arrived data;
the method further comprising: the device scheduling and transmitting the arrived data with the delay-tolerant characteristic when a delayed time of the arrived data reaches an upper limit of a delay-tolerant time; wherein, the upper limit of the delay-tolerant time is configured in advance through any one of the following ways:
taking the delay index included in the quality of service level corresponding to the arrived data as the upper limit of the delay-tolerant time;
taking the delay-tolerant time agreed by the network side and the user equipment in advance and corresponding to a logic channel that has the delay-tolerant characteristic and includes the arrived data as the upper limit of the delay-tolerant time;
taking the delay-tolerant time agreed by the network side and the user equipment in advance and corresponding to a wireless bearer that has the delay-tolerant characteristic and includes the arrived data as the upper limit of the delay-tolerant time;
taking the delay-tolerant time agreed by the network side and a delay-tolerant user equipment in advance and corresponding to the device that has the delay-tolerant characteristic as the upper limit of the delay-tolerant time;
the method further comprising:
the device scheduling and transmitting the arrived data with the delay-tolerant characteristic when a total amount of data to be transmitted in an uplink data transmission buffer or a downlink data transmission buffer corresponding to the user equipment reaches or exceeds a second preset threshold; and
the device scheduling and transmitting the arrived data with the delay-tolerant characteristic when a total amount of data in a buffer of a logic channel including arrived uplink data and arrived downlink data and corresponding to the user equipment reaches or exceeds a third preset threshold.

2. The method according to claim 1, wherein, the delay-tolerant characteristic refers to: delaying the data during a scheduling and transfer process of the data.

3. The method according to claim 1, wherein, the device determines that the arrived data have the delay-tolerant characteristic when the arrived data accord with one or more of the following conditions:
a delay tolerance of the arrived data exceeds a first preset threshold;
a service to which the arrived data belong is a service with the delay-tolerant characteristic;
the arrived data are included in a logic channel with the delay-tolerant characteristic;
the arrived data are included in a data wireless bearer with the delay-tolerant characteristic; and
the user equipment corresponding to the arrived data has the delay-tolerant characteristic,
preferably,
wherein, the delay tolerance of the arrived data is: a delay index included in a quality of service level corresponding to the arrived data.

4. The method according to claim 3, wherein, the delay tolerance of the arrived data exceeding a first preset threshold refers to:
the delay index included in the quality of service level corresponding to the arrived data exceeding the first preset threshold.

5. The method according to claim 4, wherein, the first preset threshold is configured through any one of the following ways:
- the user equipment making an agreement with a network side in advance;
- the network side configuring for the user equipment through an S1 dedicated signaling, a radio resource control (RRC) dedicated signaling or a media access control layer control element (MAC CE); and
- the network side setting by itself, and configuring in a core network and/or a base station.

6. The method according to claim 1, wherein, the second preset threshold and the third preset threshold are configured in advance through any one of the following ways:
- the user equipment making an agreement with the network side in advance;
- the network side configuring for the user equipment through the S1 dedicated signaling, the RRC dedicated signaling or the MAC CE; and
- the network side setting by itself, and configuring in a core network and/or a base station.

7. The method according to claim 1, wherein, the delayed time of the arrived data reaching the upper limit of the delay-tolerant time refers to:
- the delayed time of the data being greater than or equal to the upper limit of the delay-tolerant time; or
- the delayed time of the data added by a preset time offset being greater than or equal to the upper limit of the delay-tolerant time, preferably,
- wherein, the preset time offset is configured in advance through any one of the following ways:
- the network side making an agreement with the user equipment in advance; and
- the network side configuring for the user equipment through the S1 dedicated signaling, the RRC dedicated signaling or the MAC CE.

8. An apparatus for data scheduling, comprising hardware performing instructions stored in a non-transitory computer readable medium which executes steps in following modules:
- a first module, configured to: when data arrive at a device, judge whether the arrived data have a delay-tolerant characteristic or not; and
- a second module, configured to: if the arrived data have the delay-tolerant characteristic, delay scheduling and transmission of the arrived data; and if the arrived data do not have the delay-tolerant characteristic, immediately initiate a call process or immediately initiate a data transmission process;
- wherein, the device is a user equipment or a base station; when the device is the user equipment, the arrived data are uplink data, and when the device is the base station, the arrived data are downlink data corresponding to the user equipment;
- wherein, the second module is configured to delay the scheduling and transmission of the arrived data by means of:
  - when the user equipment is in a radio resource control IDLE state, making the user equipment postponing initiating a random access procedure and then schedule and transmit the arrived data, or making the base station postponing initiating a paging process and then schedule and transmit the arrived data; and
  - when the user equipment is in a radio resource control connected state, making the user equipment postponing triggering a schedule request and then schedule and transmit the arrived data, or making the user equipment triggering the schedule request and delay transmitting the schedule request and then schedule and transmit the arrived data;
- wherein, the second module is further configured to schedule and transmit the arrived data with the delay-tolerant characteristic when a delayed time of the arrived data reaches an upper limit of a delay-tolerant time; wherein, the upper limit of the delay-tolerant time is configured in advance through any one of the following ways:
  - taking the delay index included in the quality of service level corresponding to the arrived data as the upper limit of the delay-tolerant time;
  - taking the delay-tolerant time agreed by the network side and the user equipment in advance and corresponding to a logic channel that has the delay-tolerant characteristic and includes the arrived data as the upper limit of the delay-tolerant time;
  - taking the delay-tolerant time agreed by the network side and the user equipment in advance and corresponding to a wireless bearer that has the delay-tolerant characteristic and includes the arrived data as the upper limit of the delay-tolerant time;
  - taking the delay-tolerant time agreed by the network side and a delay-tolerant user equipment in advance and corresponding to the device that has the delay-tolerant characteristic as the upper limit of the delay-tolerant time;
- the second module is further configured to schedule and transmit the arrived data with the delay-tolerant characteristic when a total amount of data to be transmitted in an uplink data transmission buffer or a downlink data transmission buffer corresponding to the user equipment reaches or exceeds a second preset threshold;
- the second module is further configured to schedule and transmit the arrived data with the delay-tolerant characteristic when a total amount of the data in a buffer of a logic channel including arrived uplink data and arrived downlink data and corresponding to the user equipment reaches or exceeds a third preset threshold.

9. The apparatus according to claim 8, wherein, the delay-tolerant characteristic refers to: delaying the data during a scheduling and transfer process of the data.

10. The apparatus according to claim 8, wherein, the first module is configured to determine that the arrived data have the delay-tolerant characteristic when the arrived data accord with one or more of the following conditions:
- a delay tolerance of the arrived data exceeds a first preset threshold;
- a service to which the arrived data belong is a service with the delay-tolerant characteristic;
- the arrived data are included in a logic channel with the delay-tolerant characteristic;
- the arrived data are included in a data wireless bearer with the delay-tolerant characteristic; and
- the user equipment corresponding to the arrived data has the delay-tolerant characteristic, preferably,
- wherein, the delay tolerance of the arrived data is: a delay index included in a quality of service level corresponding to the arrived data.

11. The apparatus according to claim 10, wherein, the delay tolerance of the arrived data exceeding a first preset threshold refers to:

the delay index included in the quality of service level corresponding to the arrived data exceeding the first preset threshold.

12. The apparatus according to claim 11, wherein, the first preset threshold is configured through any one of the following ways:

the user equipment making an agreement with a network side in advance;

the network side configuring for the user equipment through an S1 dedicated signaling, a radio resource control (RRC) dedicated signaling or a media access control layer control element (MAC CE); and the network side setting by itself, and configuring in a core network and/or a base station.

13. The apparatus according to claim 8, wherein, the second preset threshold and the third preset threshold are configured in advance through any one of the following ways:

the user equipment making an agreement with the network side in advance;

the network side configuring for the user equipment through the S1 dedicated signaling, the RRC dedicated signaling or the MAC CE; and the network side setting by itself, and configuring in the core network and/or the base station.

14. The apparatus according to claim 8, wherein, the delayed time of the arrived data reaching the upper limit of the delay-tolerant time refers to:

the delayed time of the data being greater than or equal to the upper limit of the delay-tolerant time; or the delayed time of the data added by a preset time offset being greater than or equal to the upper limit of the delay-tolerant time, preferably, wherein, the preset time offset is configured in advance through any one of the following ways:

the network side making an agreement with the user equipment in advance; and the network side configuring for the user equipment through the S1 dedicated signaling, the RRC dedicated signaling or the MAC CE.

* * * * *